United States Patent
Holoubek et al.

[11] 3,984,268
[45] Oct. 5, 1976

[54] METHOD OF MAKING A FOLDABLE TUBULAR PACKAGE

[75] Inventors: George H. Holoubek; David E. Ales; Harland E. Harms; Warren E. Erickson; Maurice A. Ditmars; J. Keith Brookhart, all of Muscatine, Iowa

[73] Assignee: Dart Industries Inc., Los Angeles, Calif.

[22] Filed: Nov. 6, 1972

[21] Appl. No.: 304,024

Related U.S. Application Data

[62] Division of Ser. No. 214,654, Jan. 3, 1972, abandoned.

[52] U.S. Cl. .............................. 156/69; 93/94 M; 93/94 FC; 156/218; 156/227; 156/245; 264/DIG. 41; 264/275
[51] Int. Cl.² .................. B29D 23/10; B29D 23/20
[58] Field of Search ............ 156/69, 194, 212, 218, 156/227, 294, 474, 245; 93/36.8, 94 M, 94 FC; 53/13, 41; 229/38; 264/DIG. 41, 275

[56] References Cited
UNITED STATES PATENTS

| | | | |
|---|---|---|---|
| 1,123,976 | 1/1915 | Auchu | 93/36.8 |
| 1,754,496 | 4/1930 | Barker | 222/107 |
| 2,129,839 | 9/1938 | Henderson | 264/DIG. 41 |
| 2,129,839 | 9/1938 | Henderson | 221/60 |
| 2,411,244 | 11/1946 | Bogoslowsky | 93/36.8 |
| 2,431,537 | 11/1947 | Bogoslowsky | 93/36.8 |
| 2,440,391 | 4/1948 | Bogoslowsky | 93/36.8 |
| 3,074,837 | 1/1963 | Flax | 156/69 |
| 3,172,933 | 3/1965 | Flax | 156/69 |
| 3,660,194 | 5/1972 | Hoffmann et al. | 156/218 |
| 3,700,513 | 10/1972 | Haberhauer et al. | 156/69 |
| 3,778,321 | 12/1973 | Abbott | 93/36.8 |

*Primary Examiner*—William A. Powell
*Assistant Examiner*—Basil J. Lewris
*Attorney, Agent, or Firm*—Kenneth J. Hovet

[57] ABSTRACT

A laminated settable tubular package is disclosed having integral end and body portions of the same material. The tubular package is formed with a process and apparatus which permits head and shoulder portions to be formed as a continuation of the tubular body through folding and shaping operations. The package is substantially impermeable and has particular use for containing toothpaste, essential perfumes, oils, solvents, flavorings, and other substances in which permeation of the atmosphere and/or volatization losses are problems.

6 Claims, 17 Drawing Figures

FIG_7.

FIG_6.

FIG_9.

FIG_8.

METHOD OF MAKING A FOLDABLE TUBULAR PACKAGE

This is division of application Ser. No. 214,654, filed Jan. 3, 1972, now abandoned.

BACKGROUND OF THE INVENTION

1. Field of the Invention

The present invention is related to tubular containers and, more particularly, to structural arrangement, method and apparatus utilized to produce laminated settable tubular packages which are substantially impermeable to volatile substances and atmospheric gases.

2. Description of the Prior Art

Various packages have been manufactured for use in containing a great many products such as toothpaste or the like which may be conveniently formed as tubular containers or packages. Various highly viscous products such as toothpaste may progressively be squeezed from such a package by foldably setting and rolling the package from the enclosed end toward the dispensing end. Conventional prior art packages utilized metal foil which, of necessity, was quite thick and expensive but had the desirable characteristic of being foldably settable. Such packages composed completely of metal foil were unsatisfactory in some situations where the settable material of the metal foil became brittle and cracked and caused leakage of contents from the package. Additionally, all-metal packages have been vulnerable to corrosion by their contents.

Various plastic packages have been used, but many of the all-plastic packages allow oxidation of products therein and allow volatile fluids of products to escape through the walls thereof and consequently an all-plastic package may now serve to contain some products over a considerable period of time. Furthermore, most plastic packages are not settable but remain resilient so that they cannot be conveniently folded and squeezed in such a manner as to progressively dispense material or products such as toothpaste or the like.

In accordance with prior art teachings, laminated tubular structures have been fabricated of sheets of material having a plurality of lamina wherein metal foil is bonded at its opposite sides to a polyolefin plastic material such as polyethylene or the like. These structures have a combination of desirable characteristics due to the fact that the intermediate metallic lamina serves as a barrier for volatile fluids and oxygen as well as to provide for a settable structure which may take a set when folded and hold the plastic lamina in folded condition such as is desirable in the progressive use of a toothpaste tube or the like which is typically progressively folded as the contents are dispensed therefrom. These structures also prevent corrosion of the metallic lamina since it is protected on both inner and outer sides by plastic material. Furthermore, the outermost polyolefin lamina is readily receptive to printing for the purpose of applying labels, trademarks, or other indicia on the outer sides of the hollow tubular wall structures.

Accordingly, the laminated tubular wall structures include many desirable characteristics and have therefore become quite versatile in the packaging of a great variety of products which may be oxidizable, corrosive to metal, or which may have volatile materials which tend to escape through plastics; and further, these laminated materials are readily mechanically settable and readily receptive to printing of indicia on the outer sides thereof.

Moreover, these laminated wall structures are relatively economical since a relatively small amount of metallic foil may be used with one or more thin economical lamina of polyethylene or the like on inner and outer sides of the metal foil.

The laminated structures including two lamina of plastic and one lamina of metal foil can be produced in sheet stock. Due to the relative thickness of the lamina and the requirement for accuracy relative thereto, it has been found most economical to produce such materials in sheet stock and then to form the sheet stock into tubular wall structures by butting the edges, or forming an overlapping seam, and then heating with or without the addition of other thermoplastic material to provide a fused seam.

The prior art includes numerous patents disclosing laminated tubular wall structures with metal foil barrier lamina and wherein several separate barrier structures are required in the shoulder and neck area of the prior art packages, and the production of such packages utilizing several barrier parts has been relatively complicated and costly.

When several metallic lamina barrier parts are utilized in the shoulder and neck area of a toothpaste tube or the like, it is difficult to produce such structures accurately and to bond the various parts together in such a manner as to prevent oxidation of the product and to prevent the escape of volatile materials from products contained in the packages.

SUMMARY OF THE INVENTION

According to the present invention, there is provided a novel laminated and foldably settable tubular package having a tubular body including a laminated tubular wall structure with an integral shoulder and neck structure formed of folded portions which extend from the tubular body throughout the shoulder and neck area of the package to form a relatively thick shoulder and neck structure wherein at least three layers of the wall structure are disposed in the folded portions and in the shoulder and neck area of the package, and thereby maintain continuity of laminated plastic and metal lamina throughout the body, shoulder, and neck areas of the package.

The package of the invention includes an annular row of folded portions, preferably formed as acute triangles, of a laminated tubular body, and these folded portions are uniformly folded in an annular row and are all disposed in the same direction so as to provide strength as well as uniform structural continuity of plastic as well as a metal barrier lamina. With this structure, the entire body area as well as the shoulder and neck areas of the package can have foldable and settable characteristics as well as resistance to corrosion; and further, the metal barrier lamina prevents the escape of volatile fluids from the product and prevents oxygen from reaching the product through the plastic lamina.

The invention includes a novel method for producing a laminated and foldably settable tubular package which employs progressive formation of an annular row of crimped portions adjacent the open end of a laminated tubular body and subsequent positioning of the crimped portions into a row of acute triangular folded portions, all disposed in a substantially frusto-conical assembly of folds. In its preferred form, the method includes the forming of said triangular folded portions into an annular row in which the folded portions are all positioned, and preferably twisted and rotated in the same general direction around the axis of said frusto-conical assembly. Further, in its presently preferred form, the method includes subsequent positioning of the frusto-conical assembly to deform it into one in which it is inverted into a frusto-conical recessed shape with a central frusto-conical generally tubular portion integral therewith and in opposed disposition. This latter operation is done preferably by conforming dies in opposition to each other. The preferred method further includes a process step of the type disclosed in U.S. Pat. No. 3,047,910 to Downs in which a hot disc of plastic is placed under pressure by means of dies at said frusto-conical recess portion, and opposed frusto-conical tubular portion, of said folded portions whereupon the hot plastic under pressure is thermally and mechanically formed into an end portion which surrounds the shoulder and neck portion of the package of the invention and wherein an orifice and means for providing a closure are thermally and mechanically formed in surrounding relation with the neck portion of the package by compression molding. Alternatively, a plastic end piece can be applied by injection molding or other suitable processes.

The invention also preferably includes the use of unique dies and apparatus for the aforementioned crimping process as well as the twisting and folding process, and for forming the inverted or recessed frusto-conical and opposed concentric frusto-conical configurations preliminary to the forming and fusion of the end piece or member on the shoulder and neck structure formed by the folded portions which are integral with the tubular body structure of the package. The folded portions of the package of the invention at the shoulder and neck portions thereof, include at least three contiguous layers of the laminated wall structure so that the shoulder and neck portions of the package of the invention are quite strong and rigid and extend such that there is complete continuity of the plastic and metallic lamina throughout the body, shoulder, and neck areas of the package.

The uniform crimping and crimp twisting operations, in accordance with the invention, are particularly important when pre-forming the shoulder and neck portions relative to a laminated tubular wall structure which is initially formed of sheet stock and provided with a longitudinal seam. The preferred crimping and fold twisting operations, in accordance with the invention, insure uniform crimping and folding of laminated wall structures even though they have relatively thick, stiff seams, all of which allows all of the lamina, as well as the metallic barrier lamina, to extend uniformly and in continuity throughout the body, shoulder, and neck areas of the package of the invention.

OBJECTS

Accordingly, it is an object of the present invention to provide a novel laminated and foldably settable tubular package having a laminated wall structure including plastic and barrier lamina which extends throughout the body, shoulder, and neck area of the package and wherein folded portions are uniformly disposed in the shoulder and neck area of the package of the invention to provide for continuity throughout the body, shoulder, and neck area of the plastic lamina as well as the barrier lamina.

Another object of the invention is to provide a novel method and apparatus for forming a laminated and foldably settable tubular package which may be effectively used for containing and dispensing a great variety of viscous products such as toothpaste or other materials.

Another object of the invention is to provide a method and apparatus for forming a tubular package which is particularly adapted for accurately and uniformly crimping, folding, and forming a shoulder and neck structure integral with a tubular body having a plurality of lamina originally formed from sheet stock.

Another object of the invention is to provide a novel laminated and foldably settable tubular package having specifically novel folded structure in the shoulder and neck areas thereof, which promotes facility and economy of manufacture, reliability of manufacture and efficiency in the production and maintenance of a uniform and continuous metallic barrier lamina and plastic lamina throughout the body, shoulder, and neck areas of a package and throughout all areas therein where the product may be contained in contact with the package.

Further objects and advantages of the product and the method disclosed herein may be obvious from the following specification, appended claims, and accompanying drawings.

PREFERRED EMBODIMENTS OF THE INVENTION

Figure 1:
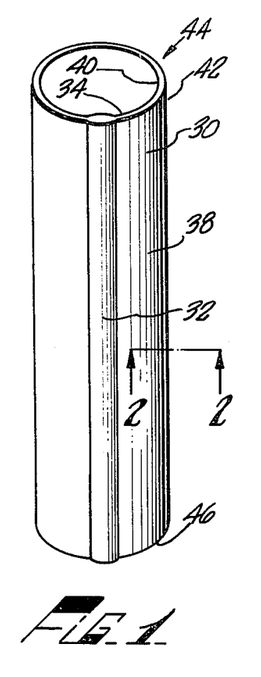
FIG. 1 is a perspective view of an exemplary tubular wall structure.

As shown in FIG. 1 of the drawings, the invention comprises a hollow tubular wall structure 30. This hollow tubular wall structure 30 can be provided with a longitudinal seam 32 but also may be formed as a tube with a spiral seam. The seam can be a fused lapped seam or one that has been folded and sealed or one utilizing a sealing strip or other adhesive material. The specific type of seam used will generally be dictated by the lamina compositions, their thickness, and the characteristics of the material to be contained within the tubular package. The same criteria is applicable in choosing a particular laminate for use in constructing the tubular package of the present invention. Any of the particular compositions known and used in the art and any number of layers and combination of metal foil, fiber, paper, and plastic material which are foldable, settable, and substantially impermeable to the products contained, are suitable for use as lamina in the present invention. Exemplary of suitable plastic materials are polyethylenes, polyvinylchlorides, polyvinylidene chlorides, polyvinyl acetates, polypropylenes, nylons, polyacrilonitrile, copolymers of the above, copolymers of ethylene and acrylic acid, and the like. The compositions, number of lamina, and their location with respect to each other in forming the laminate used in the tubular package are not deemed to be part of the novel aspects of the present invention. It is desirable, however, that an outer surface of the tubular body comprise a material that can bond together when the laminate is folded upon itself and formed into head and shoulder portions. It is also desirable that the outer surface be bondable to a plastic end piece which may be subsequently molded thereto. This is not critical, however, because a mechanical interlock can result when plastic material is forced upon the folded portion during formation of the end piece.

Figure 2:
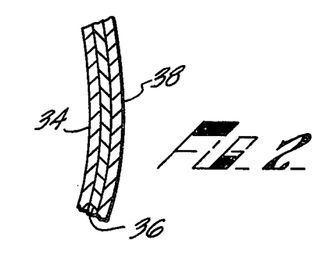
FIG. 2 is an enlarged fragmentary sectional view taken on line 2—2 of FIG. 1.

An example of a three-layered laminate is shown in FIG. 2 of the drawings wherein the wall structure of the tubular structure 30 comprises an inner lamina 34, an intermediate lamina 36, and an outer lamina 38. The intermediate lamina 36 can be a metal foil such as lead or aluminum, and the lamina 34 and 38 may be flexible plastic lamina such as a thermoplastic polyolefin, as for example, polyethylene, polypropylene, nylon, polyurethane, polyester, or the like, as described above.

The lamina 34 is disposed on the inner side of the tubular wall structure 30, while the lamina 38 is disposed on the outer side of the tubular wall structure 30, the inner side of the tubular wall structure 30 being designated 40 and the outer side being designated 42.

The lamina 34 at the inner side prevents corrosive material from attacking the metallic lamina 36 while the plastic lamina 38 on the outer side 42 is compatable with many materials used for printing of indicia on the outer sides of packages such as toothpaste tubes or the like.

The metallic lamina 36 is capable of acting as a barrier to the passage of fluids from a product at the inner side 40 and prevents the migration of oxygen from the atmosphere through the lamina 34 and 38 and into the product on the inner side 40.

The plastic lamina 34 and 38 are pliable but somewhat resilient, while the metallic lamina 36 is foldably settable and of sufficient thickness relative to the lamina 34 and 38 so that the tubular wall structure 30 may be folded flat and then rolled up in folded condition in a manner common to the well known metallic toothpaste tube, so that the package of the invention, as will be hereinafter described, may be used to dispense contents therefrom in a manner similar to the well known practice of metallic squeeze tubes of the type that are commonly used for toothpaste. It will be appreciated, however, that since the plastic lamina 34 and 38 are on both inner and outer sides of the metallic lamina 36, fracture of the metallic lamina 36 is not liable to occur and is of minor importance since in the event such fracture does occur it will most likely be in the area of tightly folded portions and will not permit leakage due to the existence of the plastic lamina 34 and 38 at opposite sides thereof. It will be understood that in certain instances where the foregoing considerations are not important, a laminate having only a single plastic layer bonded to the outer surface of a barrier layer can be used. Moreover, laminates having additional layers of metal, paper, and plastics can also be used.

Figure 3:
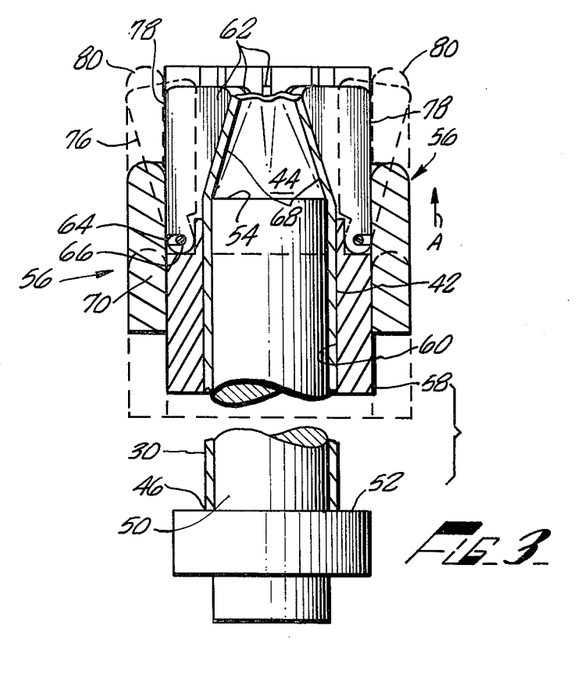
FIG. 3 is a fragmentary sectional view showing a crimping die performing a crimping operation according to the invention on a laminated tubular wall structure.
Figure 4:
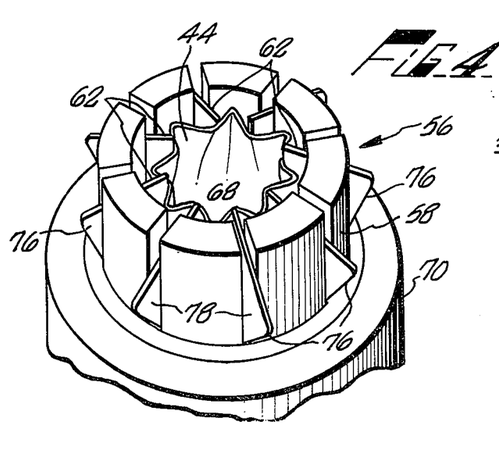
FIG. 4 is a fragmentary perspective view of a crimping die as shown in section in FIG. 3 of the drawings.
Figure 5:
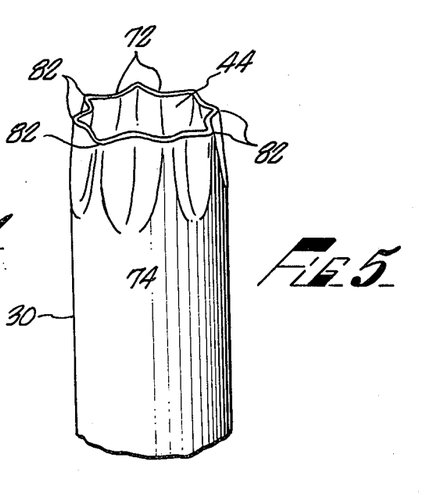
FIG. 5 is a fragmentary perspective view of a crimped end of a hollow tubular wall structure following the operation shown in FIGS. 3 and 4 of the drawings.

The laminated tubular wall structure 30 is provided with opposite open ends 44 and 46 as shown in FIG. 3 of the drawings. A male mandrel 50 having a shoulder 52 is inserted into the interior of the tubular wall structure 30 to a position wherein the open end 46 thereof rests on the shoulder 52 of the mandrel 50. The mandrel 50 is provided with a substantially flat end 54 at right angles, and during the operation shown in FIG. 3 a crimping die assembly such as shown in FIGS. 3 and 4 is placed in surrounding relation with the outer side 42 of the hollow tubular wall structure 30. The die assembly 56 is provided with a sleeve 58 having a bore 60 closely conforming with the outer side 42 of the hollow tubular wall structure 30. Mounted to the sleeve 58 are a plurality of fingers 62 which are pivotally held by a circular ring 64 in notches 66 of such fingers 62. The fingers 62 are provided with edge portions 68 directed inwardly toward the outer side 42 of the tubular wall structure 30 near the open end 44 thereof. A die sleeve 70 is slidably movable on the die 58 in the direction of the arrow A as shown in FIG. 3 of the drawings, so as to pivotally force the fingers 62 inwardly to deform the tubular wall structure 30 into the shape as shown in FIG. 5 of the drawings. The fingers 62 are uniformly spaced in an annular row around the axis of the mandrel 50 and they are disposed, when moved inwardly by the ring 70, to present a substantially frusto-conical disposition relative to each other so as to form a frusto-conical crimp at the end 44 of the tubular wall structure. The equal spacing of the fingers 62 provides for evenly spaced undulated crimped portions 72 as shown in FIG. 5 of the drawings at said open end 44, and these crimped portions 72 are provided with terminus portions 74 which terminate on the tube 30 at a location substantially at the end 54 of the mandrel 50 which restricts the formation of the crimps when the fingers 62 are moved and cammed inwardly from broken line positions 76 to the solid line positions 78, shown in FIG. 3 of the drawings.

As shown in FIG. 5 of the drawings, the crimped portions 72 are disposed generally in the frusto-conical form and while they are held in this form, as shown in FIG. 3 of the drawings, by the sleeve 70 as it is moved into a broken line position 80, the male die 50 is removed and heat can be applied internally of the tubular wall structure 30 if desired to effect thermal setting of the lamina 34 and 38 so as to ensure retention of the uniformly spaced annular row of crimped portions 72 as shown in FIG. 5. These crimped portions 72 are provided with radially extended singular portions 82 which, according to a further process step of the invention, are twisted into complete folded portions.

Figures 6, 7, 8, 9:
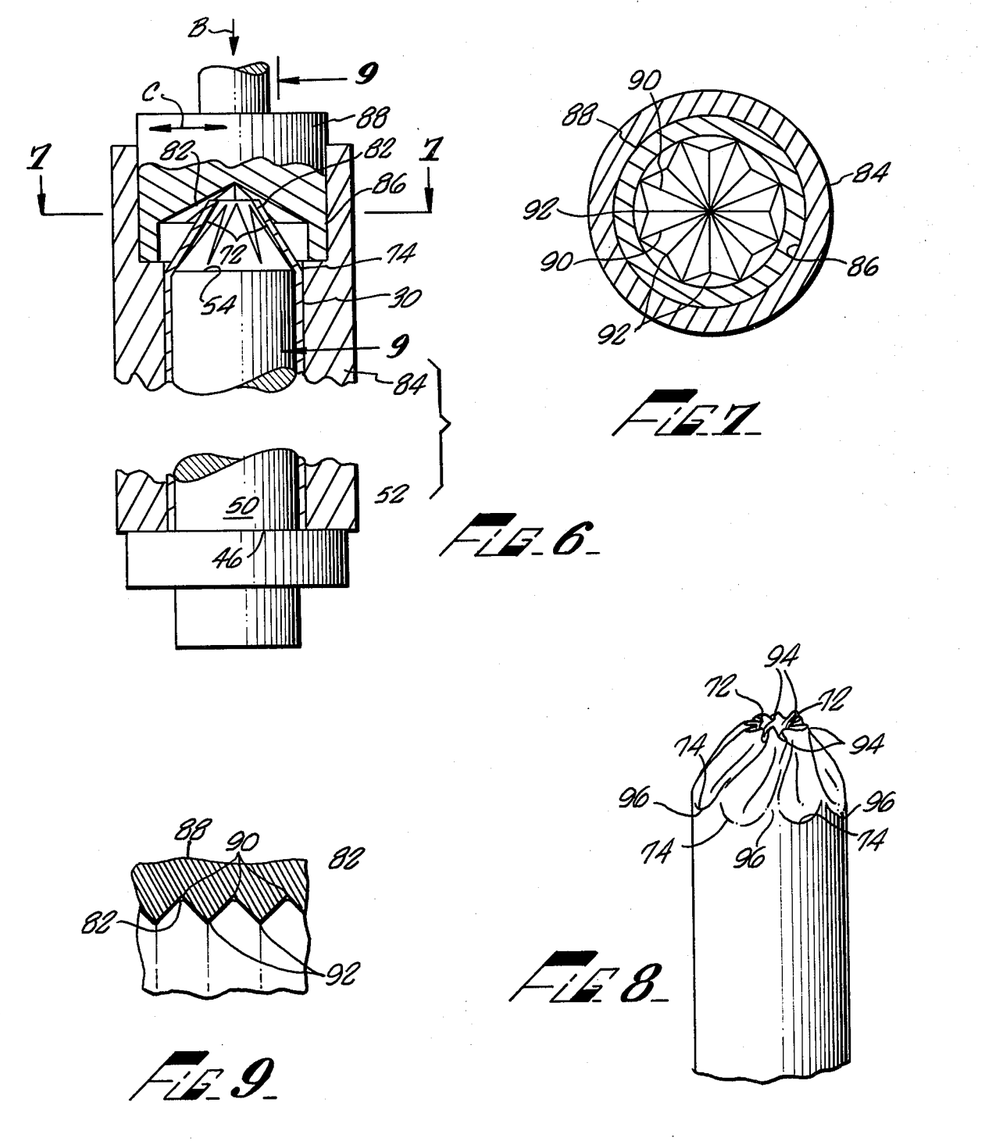
FIG. 6 is a fragmentary sectional view of a crimp twisting die structure showing the crimped tubular wall structure disclosed in FIG. 5 in position to be twisted into the shape shown in FIG. 8.
FIG. 7 is a fragmentary sectional view taken from the line 7—7 of FIG. 6 showing details of the crimp twisting die.
FIG. 8 is an enlarged perspective view of a tubular wall structure similar to that as shown in FIG. 5 but following the crimp twisting operation thereon by means of the dies as shown in FIGS. 6 and 7.
FIG. 9 is an enlarged fragmentary sectional view taken from the line 9—9 of FIG. 6 and showing a section of the crimp folding and twisting die.

As shown in FIG. 6 of the drawings, the crimped tubular wall structure 30 in the crimped condition as shown in FIG. 5 is again positioned on the male die 50 and abutted at the end 46 with the shoulder 52 of the male die 50. The end 54 of the male die 50 coincides generally with the terminus portion 74 of the crimped portions 72 and a female die 84 closely conforms to and surrounds the outer side 42 of the tubular wall structure 30. The die 84 is provided with an enlarged pilot bore 86 wherein a crimp folding die 88 is rotatably mounted. The die 88 is provided with radially and axially recessed portions 90 with intermediate ridges 92, also shown in FIG. 9 of the drawings. The undulated crimped portions 72 coincide in number with the recess portions 90 of the die 88 and the radially extended partially folded crimped portions 82, shown in FIG. 5, are engaged in the corresponding recesses 90 and the die 88 can be moved slightly in the direction of the arrow B shown in FIG. 6, while being rotated in either direction as shown by arrow C, thus rotatably twisting the partially crimped portions 82 into fully folded crimped portions 94 as shown in FIG. 8 of the drawings. It will be seen that inasmuch as the die 88 is rotated in either of the directions of the arrow C, all of the partially folded crimped portions 82 will be twisted and rotatably folded in the same direction, and formed into a uniformly folded frusto-conical form as shown in FIG. 8, wherein each folded portion 94 is preferably an acute triangle having an apex portion 96 generally located between the hereinbefore described terminus portions 74 which were formed at the end 54 of the die 50. Thus, each folded portion 94 has an apex which coincides with the perimeter of the hollow tubular laminated wall structure 30 and the annular row of folded portions 94 is of considerably smaller diameter than the outside diameter of said hollow tubular wall structure 30 when formed as shown in FIGS. 6 and 8 of the drawings.

When considering the structure of the hollow tubular wall structure 30, and particularly those having heavy seams such as seam 32, the operation of the dies and method disclosed in FIGS. 3 and 6 is very important. Inasmuch as the seam 32 as shown in FIG. 1 is relatively stiff compared to the remainder of the tubular wall structure 30, it is very important that the crimping performed as shown in FIG. 3, and resulting as shown in FIG. 5, be precisely accomplished and uniformly finished to obtain a uniform result. Subsequently, it is important that all of the crimped portions be uniformly engaged by the die 88 or by equivalent means for uniformly twisting and folding the crimped portions 72 and 82 into the completely folded portions and particularly into an annular row in which the folded portions all extend uniformly in the same direction, and wherein these crimped portions become folded into acute triangular portions with their apices generally terminating at the perimeter of the hollow tubular laminated wall structure. In furtherance of the above objectives, it is important that first contact and inwardly forward motion of the fingers 62 to the tube be at a location below the tube end 44, generally a distance equal to at least half the tube diameter. The tube resistance to bending at this point maintains the folds under tension and, as the fingers move toward the center, wrinkles are prevented thereby insuring uniform and repeatable folds.

Figures 10, 11, 12, 13:
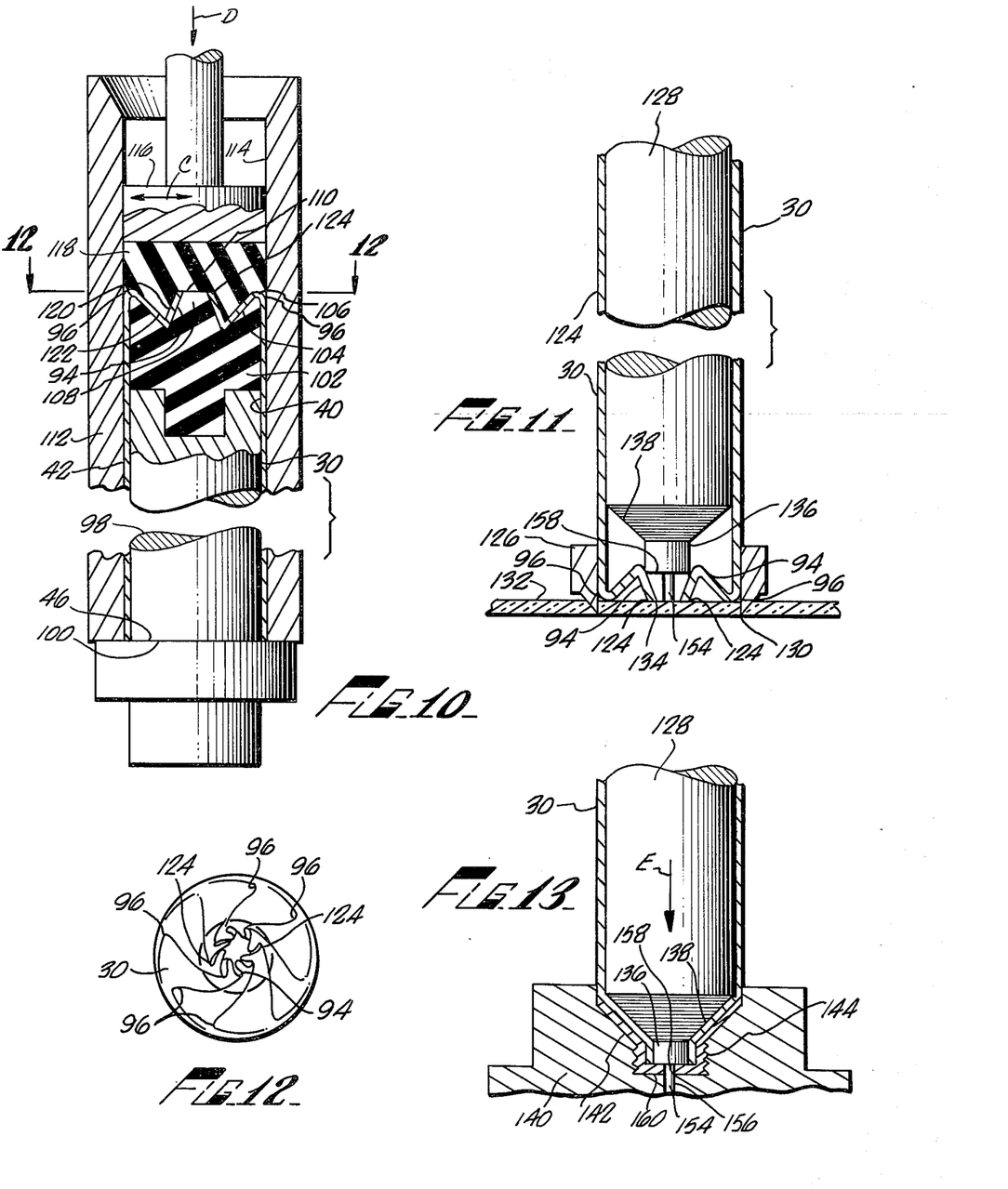
FIG. 10 is a fragmentary sectional view of dies and of the part shown in FIG. 8 being deformed further to convert the frusto-conical assembly of folded portions as shown in FIG. 8 to the form shown generally in FIGS. 10 and 11.
FIG. 11 is a fragmentary sectional view showing a preferred process step subsequent to that shown in FIG. 10.
FIG. 12 is a sectional view taken from the line 12—12 of FIG. 10 showing an end of the tubular wall structure as formed in the dies disclosed in FIG. 10.
FIG. 13 is a fragmentary sectional view of dies and an end product of the invention wherein the final processing step is performed.

As shown in FIG. 10, the crimped and folded structure of the tubular wall structure disclosed in FIG. 8 may be further formed by a male die 98 that is similar to the die 50 and provided with a stop shoulder 100 on which the open end 46 of the hollow tubular wall structure is disposed after it has been formed, as shown in FIG. 8 of the drawings. The male die 98 is provided with a die portion 102 which may be made of hard metal or relatively soft or resilient material such as rubber or the like, and this die portion 102 is provided with an annular frusto-conical recess 104 which is inverted and extends convergingly into the die portion from a peripheral end 106 thereof. The die portion 102 is provided with a central concentric frusto-conical portion 108 which is concentric to the inverted frusto-conical portion 104 and the end of this concentric or central frusto-conical portion is designated 110 and extends into substantially an axial position coinciding with the peripheral end 106 of the die portion 102.

The die portion 102, as well as the male die 98 which carries it, conforms closely to the inner side 40 of the hollow tubular wall structure 30. The outer side of the hollow tubular wall structure 30 is surrounded by cylindrical die 112 having a bore 114 which closely conforms with said outer side 42 of the tubular wall structure 30. A second forming die 116 is provided with a die portion 118 having a shape complemental to that of the die portion 108 and this complemental portion comprises a generally frusto-conical recess portion 120.

The frusto-conical recess 120 generally conforms to the frusto-conical die portion 108 and the frusto-conical recess 120 is adapted to surround and fit over the annular row of folded portions 94 as shown in FIG. 8, when that structure is placed in the die 112, and when the die 116 is moved in either direction of arrow C in FIG. 10 of the drawings. The die portion 118 is also provided with a frusto-conical portion 122 which generally conforms to the inwardly directed frusto-conical recess 104 of the die portion 102 so as to deform the folded portions 94 into the general cross-sectional shape as shown in FIG. 10 of the drawings so that ends 124 of the folded portions 94 are extended a distance about equal to or less than a common plane of the apices 96 of the folded portions 94. After being formed in accordance with the foregoing, a head piece is integrally applied to the tube by a process preferably similar to that described in U.S. Pat. No. 3,047,910 to Myron H. Downs. Alternatively, the head pieces can be applied by in situ injection molding, fusing of previously injection molded head pieces, or other compatable processes. In the preferred process, the tubular wall structure 30 is removed from the dies 98 and 112 and placed onto a mandrel 128.

The mandrel 128 and tube 30 are positioned within a punch die 126 which is provided with an annular cutting edge 130. This cutter, having an edge 130, cuts through a strip of hot plastic designated 132 in FIG. 11 of the drawings leaving a disc 134 of the hot plastic adhering by the heat thereof to the apices 96 and ends 124 of tube 30. The folded portions 94 are formed into a generally frusto-conical tubular form as shown in FIGS. 10 and 11, so that this frusto-conical tubular form is adapted to receive a cylindrical pilot 136 of the mandrel 128. This mandrel or male die 128 is provided with an angular sloping shoulder 138 extending from its perimeter to the reduced diameter punch portion 136 which is adapted to move into the generally frusto-conical tubular portion formed by the folded portions 94 as shown in FIG. 11.

As shown in FIG. 13, the mandrel or male die 128 is placed in a head forming die 140 and moved in the direction of an arrow E in the hollow tubular wall structure 30 so as to force the cylindrical punch 136 through the frusto-conical tubular portion which is disposed centrally and defined by the folded portions 94. Thus the hot plastic 134 is forced under pressure into a cavity 142 which generally conforms to the shape of the shoulder 138 and the punch 136. The cavity 142 is provided with thread forming portions 144 surrounding the neck area of the package of the invention which is formed from the frusto-conical tubular section of the folded portions 94 which causes the frusto-conical tubular folded portions to be formed around the straight cylindrical punch 136 and to become a straight wall tubular neck portion 146 as shown in FIG. 15 of the drawings.

Figures 14, 15, 16, 17:
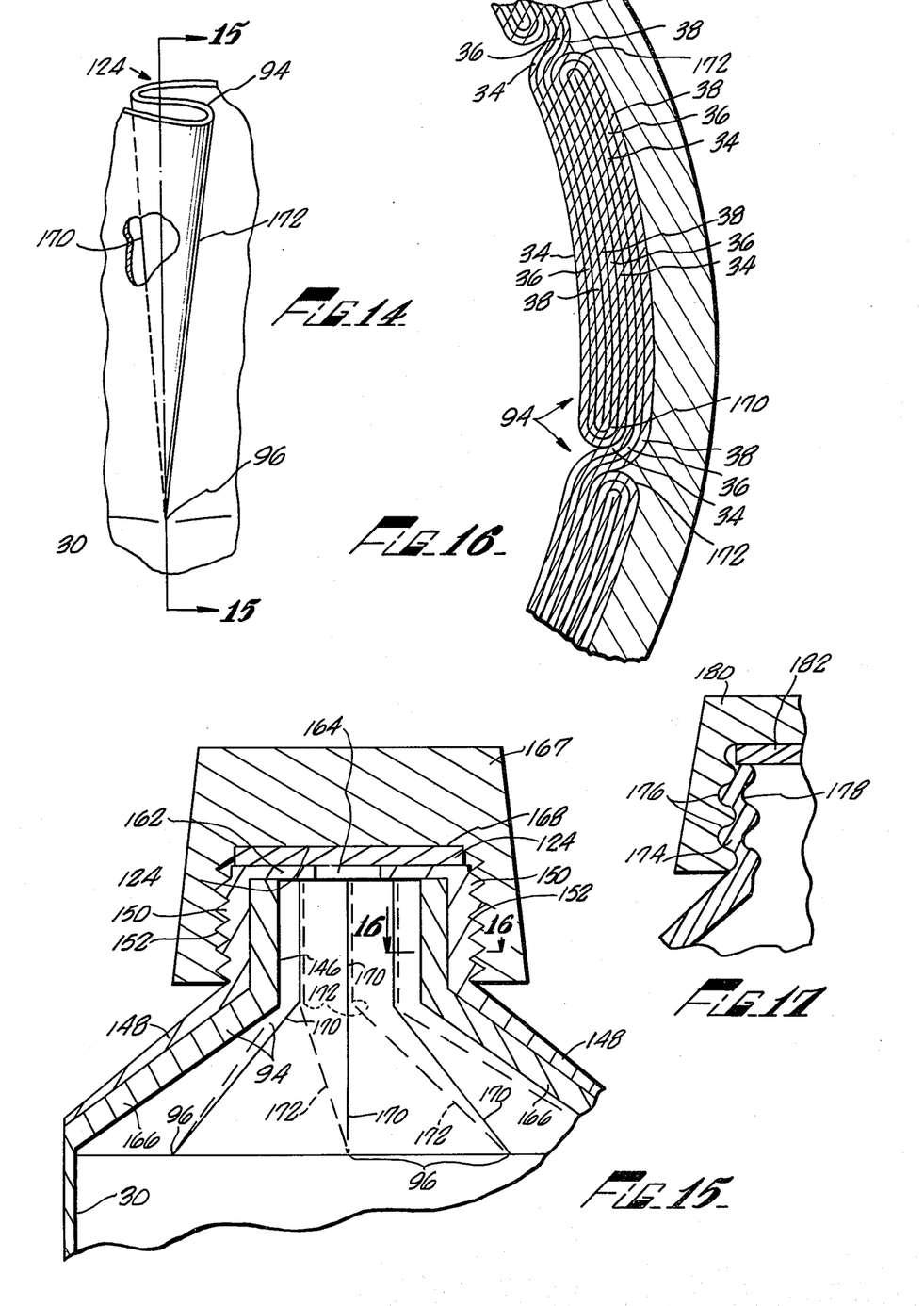
FIG. 14 is an enlarged fragmentary sectional view of acute triangular folded portion of the preferred form of the invention which can form a structure extending throughout the shoulder and neck area of the package of the invention and generally as formed in the step shown in FIG. 6 and illustrated in FIG. 8.
FIG. 15 is an enlarged fragmentary axial sectional view of the completed shoulder and neck portions of the invention with a closure cap thereon.
FIG. 16 is an enlarged fragmentary sectional view taken from the line 16—16 of FIG. 15.
FIG. 17 is an enlarged fragmentary sectional view similar to FIG. 15 but showing a modification of the invention.

When the die 128 at its shoulder 138 forces the folded portions 94 to conform therewith, the triangularity of the folded portions are deformed around the punch 136 and become more nearly parallel in this area, and the folded portions 94 are then substantially as shown in FIGS. 15 and 16. The folded portions 94 are shown on enlarged scale in FIG. 14 and are illustrated in FIG. 14 in somewhat the same state of disposition as they are shown in FIG. 8 of the drawings; however, the illustration in FIG. 14 is intended to amplify the disclosure due to large scale for the purpose of clarifying the entire structure as illustrated.

It will be appreciated that when the hot plastic 134 is formed under pressure onto the outer side portions of the folded portions 94, the outermost plastic layer 38 becomes plastically bonded to the plastic 134 and that it is caused to flow into the general cross-sectional shape as indicated in FIGS. 13 and 15, to form an end member having a shoulder covering portion 148 and a neck surrounding portion 150 comprising helical screw thread portions 152 formed by the screw thread forming portions 144 in the die 140. Other neck configurations may be formed, such as flanges, depending on the type of closure means being utilized.

Integral with the punch 136 is a reduced diameter orifice forming pin 154 which is punched through the plastic 134 and passes through an opening 156 in the die 140. The die 140, together with the travel of the punch 128, is so arranged that an end portion 158 of the punch 136 stops in spaced relation to a corresponding cavity portion 160 in the die 140 so as to leave an end cover portion 162 which is disposed over the ends 124 of the folded portions 94 and this end portion 162 is provided with a product dispensing opening 164 which is left by the pin 154 of the punch 128 as it is retracted from the opening 156 and out of the hollow tubular wall structure 30.

Accordingly, it will be appreciated that all of the folded portions 94 can be finally pressed tightly together and due to the heat of the plastic 134 and/or the pressure of the punch 128 and die 140, the folded portions 94 are contiguously folded together so that the end member 162 is efficiently bonded at its shoulder portion 148 with a shoulder area 166 of the folded portions 94, this shoulder area being integral with the hollow tubular wall structure 30 and also integral with the cylindrical neck portion 146 hereinbefore described. Heat from external sources can be applied to effect such bonding, if desired. It is further contemplated that plastic material flows about the edges of the folds thereby forming mechanical bonding with the folded portions.

A closure cap 166 is engaged with the screw threads 152 as shown in FIG. 15, and the gasket 168 is held in the cap 166 over the dispensing opening 164 to prevent the escape of materials from the interior of the package of the invention as shown in FIG. 15. The use of a cap liner, however, is optional and frequently plastic caps do not require such.

As shown in FIG. 14, each triangularly folded portion at its apex 96 generally coincides with the perimeter of the hollow tubular wall structure 30, shown in FIG. 15, and opposite U-shaped folded edge portions 170 and 172 are disposed at acute angles to each other extending from the apices 96 in a diverging relation to the divergent ends of the folded portions 94, all as shown beat in FIG. 14.

With reference to FIG. 16, the U-shaped folded diverging edge portions 170 and 172 can be seen and it will be apparent that each U-shaped folded edge portion 170 is in close proximity to an adjacent folded edge portion 172, the edge portion 172 being on the outer sides of the neck structure while the edge portions 170 are on the inner side of the structure, as shown best in FIGS. 14 and 15 of the drawings.

The folded portions 94, being of at least three layers of the laminated wall structure, reinforce the shoulder portion 166 and the neck portion 146, as shown in FIG. 15, and provide a mechanical arrangement by means of which all of the lamina 34, 36, and 38 extend in complete uninterrupted continuity throughout the tubular wall structure 30, the shoulder structure 166 and the hollow cylindrical neck structure 146. The manner in which these folded portions 94 are disposed permits them to be formed without rupture and to be formed even though the seam 32 is relatively thick in one peripheral area of the hollow tubular wall structure 30. Additionally, it will be observed from FIG. 16 that each layer of each folded portion 94 contains three lamina, namely, the lamina 34, 36, and 38. It will be noted from FIG. 16 that the lamina 38 is folded against itself and is disposed generally at the outer side of the neck structure 146 while the lamina 34 is disposed generally at the inner side of the neck structure 146, and is also folded against itself so that all of the folded portions 94 are nine laminations thick and are very rigid, and since all of the plastic lamina fold against each other, pressure and heat provides for good bonding of these folded portions together when the hot plastic disc 134 is bonded to the folded portions 94 in a manner as shown in FIG. 13 of the drawings, and as hereinbefore described.

In the modification as shown in FIG. 17, the hot plastic disc 134 is not formed onto the neck and shoulder structure of the invention, but rather the folded portions 94 only are used to form a modified neck structure 174. This neck structure is provided with helically rolled screw threads having helical outward protrusions 176 and correspondingly intermediate recess portions 178 on the inside of the neck structure 174. Moreover, due to the thickness of the folded portions, it is possible to reduce somewhat the thickness of head piece 162.

It will be appreciated that when the folded portions 94 are formed into helical screw threads 176, the nine laminations in the folded portions 94, as shown in FIG. 16, are formed into a very rigid neck structure capable of holding a cap 180 and a gasket 182 therein, to enclose contents within the interior of the package of the invention. To form such a product, it can be advantageous to use relatively thicker layers of metal and/or plastic and to apply heat at various stages of the process to provide, for example, thermally set crimps or folds.

The lamina 34, 36, and 38 are thin structural layers of plastic and aluminum or lead foil, and as a specific example, the lamina 34 and 38 may be 0.005 to 0.006 inches thick, while the lamina 36 may be 0.001 inches thick and may be made of metal foil such as aluminum or lead. The lamina 34 and 38 may be made of a polyolefin material such as polyethylene or the like; however, the foregoing materials and dimensions may be varied according to the size and other characteristics of the package to be produced.

It will be obvious to those skilled in the art that the three-to-one ratio of the folded portions relative to the laminated sidewall portions of the package provides for a fairly substantial ratio of thickness and/or strength between the sidewall portion and the shoulder 166 and neck 146. Accordingly, it will be appreciated that the thickness of the lamina 36, as well as the relative thicknesses in the lamina 34 and 38 may be varied, as desired, to adjust the mechanical characteristics of the tubular structure; as for example, when the metallic lamina 36 is relatively thicker, its influence over the relatively resilient plastic lamina 34 and 38 becomes apparent relative to the intermittently progressive setting of folds at the end of a package such as a toothpaste tube or the like constructed in accordance with the present invention.

It will be seen that the folded portions 94 in areas of the tubular wall structure 30, as well as the shoulder area 166, and the neck area 146, maintains complete continuity of all of the lamina 34, 36, and 38, to provide for the prevention of escape of volatiles from the interior of the container outward, or to prevent the migration of oxygen from the atmosphere to products inside the package, and furthermore the outer lamina 34 is very receptive to various materials used for printing labels or other indicia on the outer sides of packages such as toothpaste tubes or other similar packages. While a tubular container has been discussed, containers of other geometric configurations can be used wherever the processing techniques of the invention will be advantageous.

It will be obvious to those skilled in the art that various modifications may be resorted to without departing from the spirit of the invention.

We claim:

1. A method of producing a collapsible container comprising: forming a foldably settable laminated tubular wall structure which includes at least one lamina of plastic material and one lamina of settable material; crimping portions of one open end of said tubular wall structure; folding said crimped end portions into a frusto-conical shaped head; deforming the head to form an inverted annular frusto-conical recess therein with a frusto-conical central portion; and, molding the head into a neck and shoulder portion while simultaneously bonding together the folded end portions.

2. The method of claim 1 wherein said folding step includes disposing at least three contiguous layers of said wall structure together into said neck and shoulder portions.

3. The method of claim 2 including forming an end piece comprising the steps of contacting said head with a plastic material and bonding said material to said neck and shoulder portions during said molding.

4. A method for producing a laminated foldably settable tubular package comprising: forming a laminated tubular wall structure which includes at least one lamina of plastic material and one lamina of settable material; forming a plurality of uniformly spaced undulated crimped portions at one open end of said laminated tubular wall structure; twisting said crimped portions in a common arcuate direction about the center of said open end to form folded portions having apices at a transition thereof with said tubular wall structure; forming an inverted annular frusto-conical recess in said folded portions; applying a plastic head piece to said folded portions; and, shaping said folded portions into a generally cylindrical neck portion and into a shoulder portion integral with said tubular wall structure and said neck portion.

5. A method for producing a laminated foldably settable tubular package comprising: forming a laminated tubular wall structure which includes at least one lamina of plastic and one lamina of settable metal; forming a plurality of uniformly spaced undulated crimped portions in an annular row at one end of said laminated tubular wall structure by uniformly engaging said tube end with finger means at a location below the end generally a distance equal to at least half the tube diameter; twisting said crimped portions in a common arcuate direction about the center of said annular row to form triangular folded portions having apices at a transition thereof with said tubular wall structure; deforming said folded portions into an inverted annular frusto-conical shape so that ends of said folded portions extend a distance about equal to or less than a common plane of the apices of the folded portions; applying a disc of plastic to the apices and ends of said folded portions; and, molding said disc and folded portions into a generally cylindrical neck portion and into a shoulder portion integral with said tubular wall structure and said neck portion.

6. The method according to claim 5, wherein: said plastic disc is bonded entirely externally of said folded portions.

* * * * *